March 2, 1954

W. ARMSTRONG 2,670,816

BEARING FOR USE IN HYDRAULIC SHOCK ABSORBERS

Filed Dec. 8, 1952

Inventor,
WILLIAM ARMSTRONG
By
John James Victor Armstrong,
Attorney

Patented Mar. 2, 1954

2,670,816

UNITED STATES PATENT OFFICE 2,670,816

BEARING FOR USE IN HYDRAULIC SHOCK ABSORBERS

William Armstrong, Eastgate, Beverley, England, assignor to Armstrong's Patent Company Limited, Eastgate, Beverley, England, a British company Application December 8, 1952, Serial No. 324,739

Claims priority, application Great Britain January 9, 1952

7 Claims. (Cl. 188—100)

This invention is concerned with an improved bearing for use in connection with hydraulic shock absorbers for vehicles and more particularly with shock absorbers of the so-called telescopic type in which a piston fixed to an axially extending piston rod is displaceable in an inner cylinder which is surrounded by an annular space disposed between the inner cylinder and an outer cylinder.

An object of the present invention is to provide an improved bearing for the said axially extending piston rod which allows the piston rod to be self-aligning within the inner cylinder and at the same time effectively seals the said inner cylinder against egress of any substantial quantity of hydraulic fluid therefrom.

According to the present invention an improved bearing for the purpose set forth comprises a substantially spherical member which is apertured diametrically to receive the piston rod, a pair of oppositely directed part-spherical cups supported within the outer cylinder and between which the said substantially spherical member surrounding the piston rod is journalled, and an oil seal associated with said substantially spherical member on the side thereof remote from the inner cylinder.

In one preferred form of the invention, the part-spherical cup disposed on the side of the spherical member remote from the inner cylinder also serves as a housing for the oil seal.

The oil seal may conveniently comprise an apertured rubber bushing having an inner serrated or grooved surface engaging upon the piston rod and which is held under compression between an apertured spring-loaded conical washer and a sealing cap for the outer cylinder.

In another form of the invention the oil seal may conveniently consist of a dished rubber disc having an annular re-entrant flange and which is dimensioned to receive the piston rod and held in contact with the piston rod by means of a circlip or similar retaining means.

A second or additional seal, which may or may not be of the dished rubber disc type, may be provided on the side of the first oil seal remote from the spherical bearing for the purpose of acting as a dust scraper.

The invention will now be more particularly described by reference to two specific embodiments as illustrated in Figs. 1 and 2, wherein the numbers refer to like parts.

Figure 1:
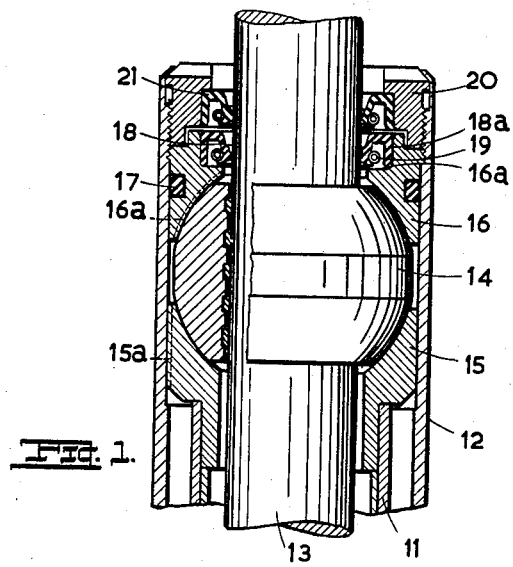
Fig. 1 is a section of one bearing according to the invention.

Referring to Fig. 1, 11 and 12 indicate the upper ends of the inner and outer cylinders respectively of a hydraulic shock absorber in which 11 serves as a compression chamber within which a piston oscillates and 12 as a reservoir for oil. A piston (not shown), axially displaceable within the compression chamber or inner cylinder 11, is supported upon a piston rod 13. The piston rod is aligned within the chamber or cylinder 11 by means of a substantially spherical member 14 bored diametrically to receive the rod 13 and which is journalled between oppositely directed part-spherical cups 15 and 16 also apertured to receive the piston rod and supported within the outer cylinder 12. The first cup 15 has an axially extending groove 15a and the second cup 16 a groove 16a each serving to permit return of oil into the reservoir or outer cylinder 12. A rubber washer 17 is located within an annular groove in the outer wall of the cup 16.

The cup 16 is counter-bored at 16a to provide a housing for a first oil seal 18 having a re-entrant annular flange 18a. The oil seal is held in contact with the piston rod 13 by a circlip 19. The end of the outer cylinder 12 is closed by an apertured sealing or closure cap 20 which is itself counter-bored to accommodate a second oil seal 21 which circumvents the piston rod 13 and serves as a dust scraper.

Figure 2:
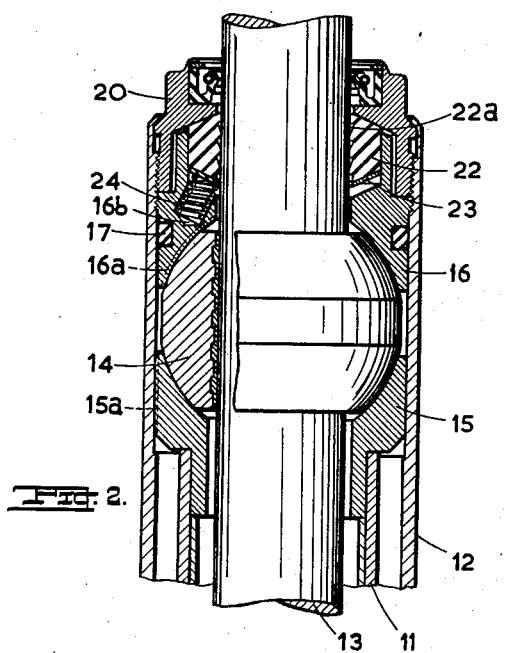
Fig. 2 is a section of a modification employing a different form of oil seal.

In the modification illustrated in Fig. 2 the first oil seal is represented by an apertured compressed rubber bushing 22 having a serrated or grooved inner surface 22a which engages upon the piston rod 13 and which is held under compression between an apertured conical metal washer 23 co-operating with one or more compression springs 24 seating in a counter-bore(s) 16b in the cup 16 and closure cap 20.

Thus it will be seen that oil forced out of the compression cylinder during the axial displacement of the piston rod 13 is detained by the oil seal and flows back into the reservoir 12 via the oil return grooves 16a, 15a.

I claim:

1. In a telescopic hydraulic shock absorber which includes an inner cylinder, an outer cylinder concentric with the inner cylinder and a piston rod axially displaceable within the inner cylinder, an improved bearing comprising a substantially spherical member which is bored diametrically to receive the piston rod, a pair of oppositely directed part-spherical cups supported within the outer cylinder and between which said substantially spherical member receiving the piston rod is journalled, said cups also being apertured to receive the piston rod, and an oil seal housed in the part-spherical cup disposed on the side of the spherical member remote from the inner cylinder.

2. In a telescopic hydraulic shock absorber which includes an inner cylinder, an outer cylinder concentric with the inner cylinder and a piston rod axially displaceable within the inner cylinder, an improved bearing comprising a substantially spherical member which is bored diametrically to receive the piston rod, a pair of oppositely directed part-spherical cups supported within the outer cylinder and between which said substantially spherical member receiving the piston rod is journalled, said cups also being apertured to receive the piston rod, and an apertured, compressed rubber bushing having a serrated inner surface which engages upon the piston rod and is housed in the part-spherical cup disposed on the side of the spherical member remote from the inner cylinder.

3. In a telescopic hydraulic shock absorber which includes an inner cylinder, an outer cylinder concentric with the inner cylinder, and a piston rod axially displaceable within the inner cylinder, an improved bearing comprising a substantially spherical member which is bored diametrically to receive the piston rod, a pair of oppositely directed part-spherical cups supported within the outer cylinder and between which said substantially spherical member is journaled, said cups also being apertured to receive the piston rod, an oil seal having a re-entrant annular flange housed in the part-spherical cup disposed on the side of the spherical member remote from the inner cylinder and a circlip holding said re-entrant annular flange in contact with the piston rod.

4. In a telescopic hydraulic shock absorber which includes an inner cylinder, an outer cylinder concentric with the inner cylinder, and a piston rod axially displaceable within the inner cylinder, an improved bearing comprising a first part-spherical cup supported within the outer cylinder and adjacent the inner cylinder, a substantially spherical member which is bored diametrically to receive the piston rod and disposed adjacent the first spherical cup on the side thereof remote from the inner cylinder, a second part-spherical cup oppositely directed to the first cup and supported within the outer cylinder on that side of the substantially spherical member remote from the first cup, said spherical member being journalled between said first and second part-spherical cups and said cups being apertured to receive the piston rod, an apertured compressed rubber bushing having a serrated inner surface which engages upon the piston rod and is housed in the second part-spherical cup, an apertured conical metal washer disposed between said bushing and the second part-spherical cup, a compression spring disposed in a counterbore in the second cup and contacting said washer, and a closure cap for the outer cylinder, said cap contacting said bushing.

5. In a telescopic hydraulic shock absorber as claimed in claim 4, an improved bearing in which a groove is provided in each part-spherical cup to permit return of oil to the outer cylinder.

6. In a telescopic hydraulic shock absorber which includes an inner cylinder, an outer cylinder concentric with the inner cylinder, and a piston rod axially displaceable within the inner cylinder, an improved bearing comprising a first part-spherical cup supported within the outer cylinder and adjacent the inner cylinder, a substantially spherical member which is bored diametrically to receive the piston rod and disposed adjacent the first spherical cup on the side thereof remote from the inner cylinder, a second part-spherical cup oppositely directed to the first cup and supported within the outer cylinder on that side of the substantially spherical member remote from the first cup, said spherical member being journalled between said first and second part-spherical cups and said cups being apertured to receive the piston rod, a first oil seal having a re-entrant annular flange housed in the second part-spherical cup, a circlip holding said re-entrant flange in contact with the piston rod, a second oil seal disposed adjacent and on that side of the first oil seal remote from the substantially spherical member, and an apertured sealing cap for the outer cylinder, said cap contacting the second oil seal.

7. In a telescopic hydraulic shock absorber as claimed in claim 6, an improved bearing in which a groove is located in each part-spherical cup to permit return of oil to the outer cylinder.

WM. ARMSTRONG.

References Cited in the file of this patent

UNITED STATES PATENTS

| Number | Name | Date |
|---|---|---|
| 2,574,209 | Funkhouser | Nov. 6, 1951 |

FOREIGN PATENTS

| Number | Country | Date |
|---|---|---|
| 670,128 | Great Britain | 1952 |